J. ASH.
Stove-Truck.
No. 211,828. Patented Feb. 4, 1879.
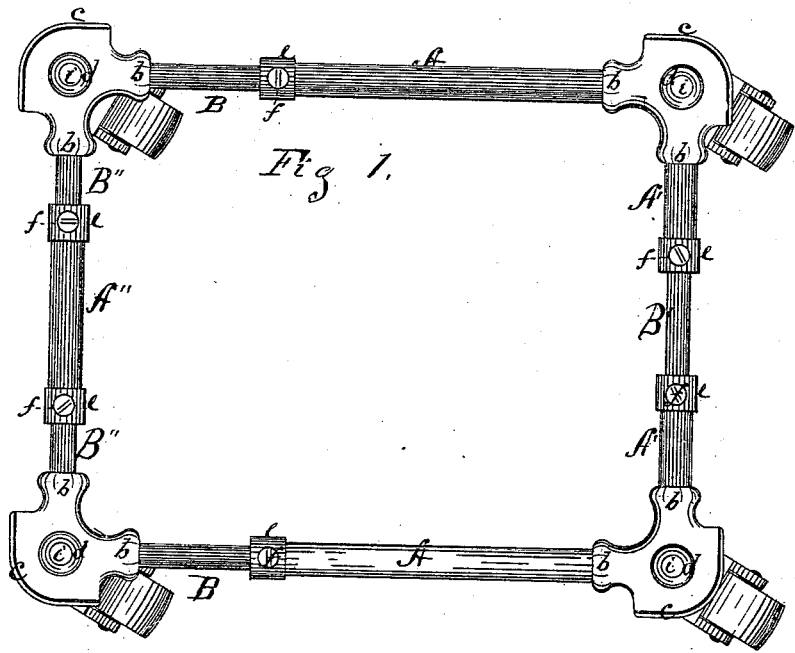
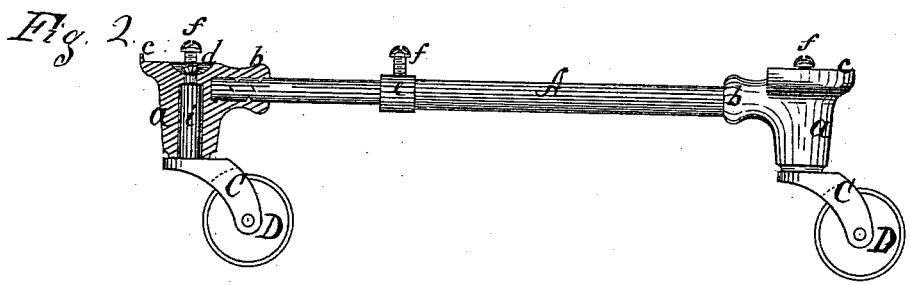

UNITED STATES PATENT OFFICE.

JAMES ASH, OF CHICAGO, ILLINOIS.

IMPROVEMENT IN STOVE-TRUCKS.

Specification forming part of Letters Patent No. 211,828, dated February 4, 1879; application filed July 25, 1878.

*To all whom it may concern:*

Be it known that I, JAMES ASH, of Chicago, in the county of Cook and State of Illinois, have invented a new and valuable Improvement in Stove-Trucks; and I do hereby declare that the following is a full, clear, and exact description of the construction and operation of the same, reference being had to the annexed drawings, making a part of this specification, and to the letters and figures of reference marked thereon.

The object of my invention is to provide a stove-truck for the purpose of exhibiting stoves or ranges in stores or exposition fairs, or any place where such goods are kept for sale.

It consists of an arrangement of a light adjustable pipe-frame, mounted on corner-casters, which can be manufactured cheaper, lighter, and stronger than any device heretofore known or used for the purpose.

My invention is illustrated in the accompanying drawings, in which Figure 1 is a top or plan view, and Fig. 2 is a side elevation of the same, being partly in section.

I am aware that stove-trucks have been used with adjustable spanners, made of flat slotted iron bars, running diagonally in the form of an X under the stove; but this arrangement does not properly hold or support the corners unless made very heavy. The casters used in such trucks have been manufactured for piano or other large wooden legs, and are provided with a socket having a large flange with holes for wood-screws for holding them in place. This flanged socket is set in a large casting, the size of which is determined by the size of the flange of the socket, which was originally intended for wood.

In my improved truck I construct a corner or caster socket especially for the purpose, which is cast in one piece, and is composed of several members, to wit: $a$ in Fig. 2 being the leg and caster-socket; $b\ b$, the spanner-arms; $c$, the upper flange which embraces the stove-leg and holds it in its place, and $d$ the concave lubricating-cup.

In Fig. 1, I show three different ways of constructing spanners, which are composed of pipes A and corresponding rods B. On the sides the pipes A A are cast into the spanner-arms $b\ b$, and are provided at their opposite ends with ferrules $e\ e$ and set-screws $f\ f$, which hold the rods B B and pipes A A rigidly together. The pipes A′ A′, in one of the ends in Fig. 1, are cast into the spanner-arms $b\ b$, their opposite ends being ferruled and set-screwed, embracing a rod in the center, thus making two adjustments in place of one, as represented on sides A B.

The plan which I have adopted and prefer in the manufacture of this truck is to cast the wrought-iron rods B B into the spanner-arms $b\ b$, and use one piece of pipe A for connecting them. The round wrought-iron rods are cut in with a chisel, or may be hammered or barbed, as shown in the sectional view in one of the corners in Fig. 2, for the purpose of anchoring them thoroughly in the cast spanner-arms $b\ b$.

The caster-pin $i$ is shouldered and riveted in the lubricating-cup $d$ just tight enough to prevent it from dropping out when not in use. Each corner is provided with a universal caster-frame, C, and wheel D, to enable them to be worked in any direction when exhibiting or running stoves from one place to another.

It will be readily understood that, as the rods B extend well into the pipes A, an extension can at any time be made to suit the truck to any sized stove, by simply unscrewing the set-screws and slipping the rods out the required distance to fit the stove to be trucked.

Having thus described my invention, what I claim, and desire to secure by Letters Patent, is—

1. In a stove-truck, the corner, leg, and socket $a$, having the spanner-arms $b\ b$, flange $c$, and lubricating-cup $d$, in combination with the universal caster $i$ C D.

2. The spanner-rods composed of pipes A, ferrules $e$, set-screws $f$, and rods B, in combination with the corners composed of leg and socket $a$, spanner-arms $b\ b$, flange $c$, lubricating-cup $d$, and caster $i$ C D, substantially as and for the purpose herein described.

In testimony that I claim the above I have hereunto subscribed my name in the presence of two witnesses.

JAMES ASH.

Witnesses:
ALVIN SALISBURY,
FRANK L. SALISBURY.